United States Patent
Li et al.

(10) Patent No.: US 7,099,518 B2
(45) Date of Patent: Aug. 29, 2006

(54) MEASUREMENT OF BLURRING IN VIDEO SEQUENCES

(75) Inventors: Bei Li, Beaverton, OR (US); Wilfried M. Osberger, Portland, OR (US)

(73) Assignee: Tektronix, Inc., Beaverton, OR (US)

( * ) Notice: Subject to any disclaimer, the term of this patent is extended or adjusted under 35 U.S.C. 154(b) by 504 days.

(21) Appl. No.: 10/198,944

(22) Filed: Jul. 18, 2002

(65) Prior Publication Data

US 2004/0013315 A1    Jan. 22, 2004

(51) Int. Cl.
G06K 9/40    (2006.01)
G06K 9/48    (2006.01)

(52) U.S. Cl. .................. 382/255; 382/199; 382/266; 382/263

(58) Field of Classification Search ............. 382/255, 382/266, 199, 263, 260; 348/606–624
See application file for complete search history.

(56) References Cited

U.S. PATENT DOCUMENTS

| | | | | |
|---|---|---|---|---|
| 4,673,276 | A * | 6/1987 | Yoshida et al. ............... 396/54 |
| 4,691,366 | A * | 9/1987 | Fenster et al. ............... 382/266 |
| 4,804,831 | A * | 2/1989 | Baba et al. ............... 250/201.2 |
| 4,896,364 | A * | 1/1990 | Lohscheller ................ 382/162 |
| 5,706,417 | A * | 1/1998 | Adelson ..................... 345/640 |
| 5,710,829 | A * | 1/1998 | Chen et al. ................. 382/173 |
| 6,330,372 | B1 * | 12/2001 | Goldstein et al. ........... 382/266 |
| 6,600,517 | B1 * | 7/2003 | He et al. .................... 348/625 |
| 6,625,396 | B1 * | 9/2003 | Sato ............................ 396/52 |
| 6,704,451 | B1 * | 3/2004 | Hekstra et al. ............. 382/199 |
| 6,888,564 | B1 * | 5/2005 | Caviedes et al. ........... 348/180 |
| 2003/0053708 | A1 * | 3/2003 | Kryukov et al. ............ 382/261 |
| 2003/0117511 | A1 * | 6/2003 | Belz et al. ............. 348/333.11 |

FOREIGN PATENT DOCUMENTS

EP    0 942 602    9/1999

OTHER PUBLICATIONS

Lu, Juihuai, "Image analysis for video artifact estimation and measurement", Apr. 2001, Proceedings of Machine Vision Applications in Industrial Inspection IX, SPIE vol. 4301, pp. 166-174.*
S. Wolf and M. H. Pinson, "Spatial-Temporal Distortion Metrics for In-Service Quality Monitoring of Any Digital Video System", Institute for Telecommunication Sciences, Boulder, CO, Sep. 1999.
Huib de Ridder and Martijn C. Willemsen, "Percentage Scaling: A New Method for Evaluating Multiply Impaired Images", Proceedings of SPIE vol. 3959 (2000).

(Continued)

*Primary Examiner*—Matthew C. Bella
*Assistant Examiner*—Utpal Shah
(74) *Attorney, Agent, or Firm*—Francis I. Gray; Matthew D. Rabdau

(57) ABSTRACT

A method for determine blurring in a test video sequence due to video processing includes detecting blocks within each frame of the test video sequence that have valid image edges. An edge point within each valid image edge block is selected and a series of points defining an edge profile in the block along a line normal to the valid image edge at each edge point is defined from an enhanced edge map in which video processing blockiness artifacts have been removed. From the edge profile a blurring value is estimated for each frame or group of frames within the test video sequence. Additionally a reference blurring value may be derived from a reference video sequence corresponding to the test video sequence, which reference blurring value may be generated at a source of the reference video sequence and transmitted with the test video sequence to a receiver or may be generated at the receiver. The reference blurring value is then compared with the blurring value from the test video sequence to produce a relative blurring value for the test video sequence.

6 Claims, 5 Drawing Sheets

OTHER PUBLICATIONS

Jiuhuai Lu, "Image Analysis for Video Artifact Estimation and Measurement", Proceedings of SPIE 4301, Jan. 2001.

M.M. Chang, A.M. Tekalp and A. T. Erdem, "Blur Identification Using the Bispectrum", IEEE Transactions on Signal Processing, vol. 39, No. 10, Oct. 1991.

* cited by examiner

MEASUREMENT OF BLURRING IN VIDEO SEQUENCES

BACKGROUND OF THE INVENTION

The present invention relates to video quality of service, and more particularly to the measurement of blurring in video sequences due to video processing.

A number of different factors influence the visual quality of a digital video sequence. Numerous subjective studies have shown that the amount of blurring in the video sequence is one of the factors that has the strongest influence on overall visual quality. Therefore the ability to objectively measure the amount of blurring in the video sequence is a key element in a video quality metric. A codec developer or compression service provider may use this information to modify the compression process and make informed decisions regarding the various tradeoffs needed to deliver quality digital video services.

Although studies have been done in blur identification, most blur identification approaches, such as spectrum, bispectrum and maximum likelihood based approaches, were developed under the assumption of uniform blur or under the restriction of only tolerating the existence of white Gaussian noise. The blurring effect resulting from block Discrete Cosine Transform (DCT) based compression may vary from one block to another due to different quantization parameters used for coding different macroblocks. Additionally noise originated from quantization of DCT components is not independent in the spatial domain, but contributes to blocking errors and high frequency noise around edges. Blur distortion in MPEG and H.263 video sequences is caused by DCT quantization. When the quantization truncates the high frequency DCT coefficients completely, the loss appears as blur in the video sequence. Because quantization level changes across block boundaries, the resulting blur as well as quantization noise vary accordingly.

A single-ended blur estimation scheme was proposed by Jiuhuai Lu in the Proceedings SPIE 4301—Machine Vision Applications in Industrial Inspection—San Jose, Calif., January 2001 in a paper entitled "Image Analysis for Video Artifact Estimation and Measurement". The scheme has several steps, including pre-processing to eliminate artifacts that produce spurious edges, evaluation point selection to choose appropriate places for blur estimation, blur estimating at each selected evaluation point and averaging to provide a frame-based blur estimate. For blur estimation edges of blocking boundaries may be reduced by simple lowpass filtering. The evaluation point selection determines a set of image edge points on the basis of edge intensity and connectivity to eliminate blurring due to other than quantization in compression. Finally a statistical approach is used to estimate the extent of picture blur by extracting an edge profile spread at the selected edge points using a norm of the edge gradient as follows:

1) compute the gradient vector at the current evaluation point,
2) sample the edge image e(x,y) along both sides of the gradient vector centered at the evaluation point,
3) set the data series of the sampled edge values as the edge profile at the evaluation point,
4) compute the edge profile spread.

The edge profile p is centered at point (x,y) being evaluated and is equally spaced. An autocorrelation of the edge profile is obtained and used to obtain the edge profile spread. The edge profile is corrected if it has a tilted baseline before computing the autocorrelation function. The blur estimation of the video picture or frame is the average of the edge profile spread at all chosen evaluation points. This disclosed technique is general and does not provide specific details for providing an accurate and robust measurement, and only applies to single-ended applications, not to double-ended or reduced-reference applications.

What is desired is to provide an accurate, robust, repeatable and computationally feasible method of measuring blurring in video sequences for use in any application that requires video quality measurement.

BRIEF SUMMARY OF THE INVENTION

Accordingly the present invention provides for measurement of blurring in video sequences by filtering a test video sequence with both an edge definition filter and an edge enhancement filter. The output from the edge definition filter together with block size information is used to determine those blocks within each frame of the test video sequence that contain a valid image edge. The output from the edge enhancement filter together with the block size information, after elimination of block boundary edges induced by video processing if appropriate, is used with the valid image edge blocks to select edge points. Normals to the valid image edges at the edge points as a function of the edge enhancement filter output are used to estimate a blurring value for each frame of the test video sequence.

For reduced-reference or full reference applications a reference blurring value is generated from a reference video sequence corresponding to the test video sequence, the reference blurring value either being generated at a source and transmitted with the test video sequence or being generated at a receiver together with the test video sequence. The reference blurring value is compared with the blurring value for the test video sequence to determine a relative blurring value.

The objects, advantages and other novel features of the present invention are apparent from the following detailed description when read in conjunction with the appended claims and attached drawing.

DETAILED DESCRIPTION OF THE INVENTION

Figure 1:
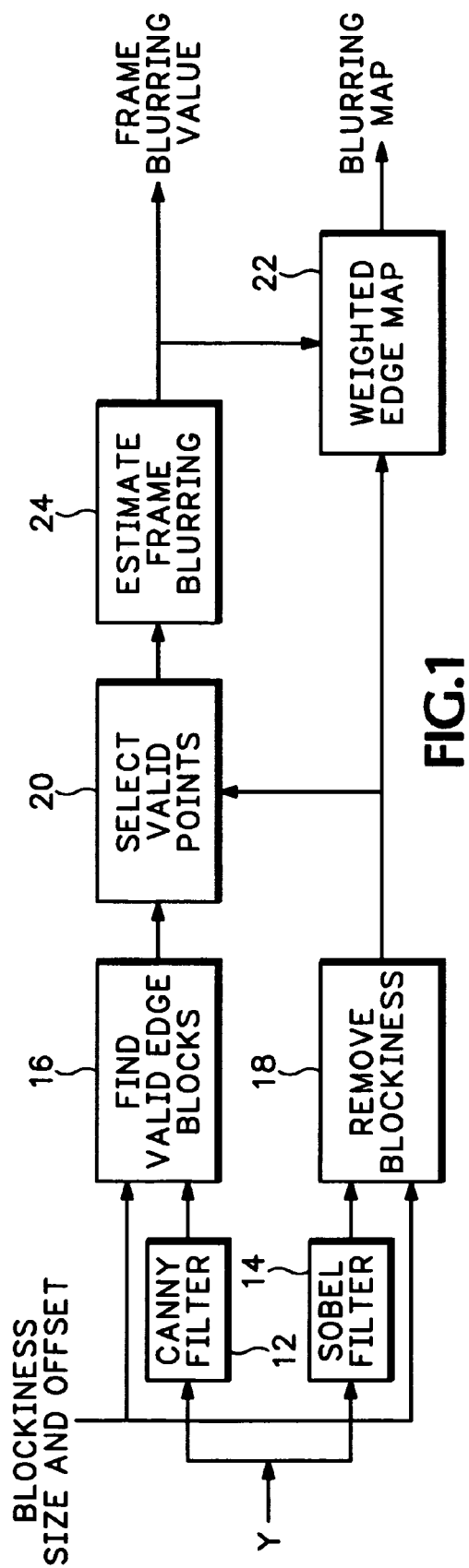
FIG. 1 is a block diagram view of a single-ended blurring estimation algorithm according to the present invention.

Referring to FIG. 1 for a single-ended measurement of blurring the luminance component (Y) of a test video image is input to both an edge definition filter, such as a Canny filter 12, and an edge enhancement filter, such as a Sobel filter 14. The Canny filter 12 produces a map having zeros at all points except edge points, which are ones. The Sobel filter 14 provides edge enhancement with values varying between zero and one (normalized). The output from the Canny filter 12 is input to a detector block 16 for finding valid "edge" blocks, i.e., quantization blocks or predetermined blocks that have a bona fide image edge. The output from the Sobel filter 14 is input to a blockiness removal block 18 for removing edges that are related to quantization blocks for compressed video sequences, i.e., are not bona fide image edges. Also input to the detector block 16 and the blockiness removal block 18 is information about the size of the blocks and any offset required for spatial alignment, if necessary. The outputs from the detector and blockiness removal blocks 16, 18 are input to a selector block 20 for selecting valid image edge points. The output from the blockiness removal block 18 also is input to a map generator 22. The output from the selector block 20 is input to a blur calculation block 24 which provides a blurring value, either on a frame basis or on a video sequence basis or both. The blurring value also is input to the map generator 22 to produce a weighted blurring map for display.

The basic idea is to find the strongest edges and/or lines in an image, or frame, of a video sequence, then to look at the edge profile at these points to see how spread the edges are, thus giving an indication of the blurring of the image. Large spreading at these points indicates that the frame is strongly blurred, while a narrow spread suggests that the image is sharp. Both the luminance frame (Y) and the blockiness size and any offset are inputs. The blockiness information allows the removal of quantization block boundaries, where appropriate, so that only true image edges are used and provides a scaling in which blocks containing valid image edges may be found. The blockiness size and offset may be either directly obtained from information in a decoder, or by running a blockiness detection algorithm, such as that described in U.S. patent application Ser. No. 09/152,495 filed Sep. 10, 1998 entitled "Picture Quality Analysis Using Blockiness" by Bozidar Janko et al. In the case where the video sequence contains no blockiness, i.e., it was not compressed by a block-based encoder, the blockiness removal process is skipped and a default block size is used when finding blocks with valid image edges in the selector block 16.

Figure 2:
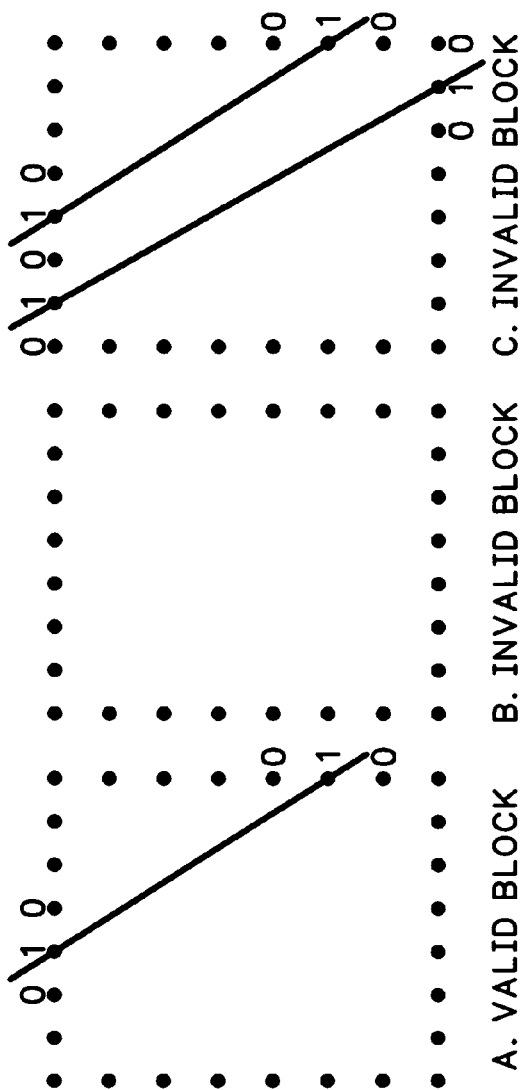
FIG. 2 is a graphic view illustrating the selection of valid blocks within a video frame for applying the blurring estimation algorithm according to the present invention.

The removal of edges in the blockiness removal block 18 may be achieved by replacing the output from the Sobel filter 14 at block boundaries with a Sobel output interpolated from nearest neighbors. The detection of blocks that contain valid image edges uses the output from the Canny filter 12 as shown in FIG. 2. The image is divided into individual blocks, using either the default block size or the block size determined by the blockiness size and offset input. A block is classed as containing an image edge if the number of transitions from zero to one around the boundary of the block equals two, as shown in FIG. 2 at A. Blocks that contain more that two transitions, such as shown at C, are likely to be textures, and therefore not so useful for blurring estimation, while blocks with less than two transitions, such as B, are likely to be flat, also inappropriate for blurring estimation.

Figure 3:
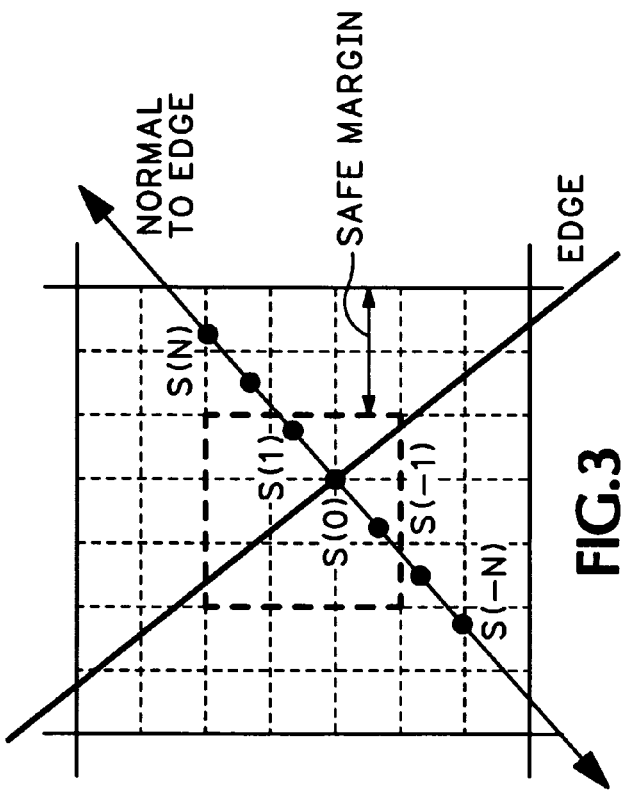
FIG. 3 is a graphic view illustrating the selection of valid edge points within a selected block for applying the blurring estimation algorithm according to the present invention.

Each valid block from the selection block 16 is further tested as shown in FIG. 3 to detect valid edge points that may be used for the blurriness estimation. The (x,y) location of a peak value of the Sobel edge map with blockiness removed within a "safe", i.e., central, area of each valid block is determined. The peak Sobel value is denoted S(0). The direction of the edge at this point is calculated from the x and y outputs of the Sobel edge map at this point. The profile of the edge is then taken normal to the edge direction. Along a line normal to the edge direction from the Sobel outputs a number of points N, typically 3–4 on either side of the valid point, are interpolated using a weighted four-point interpolation. This interpolation is necessary since the normal to the gradient generally does not coincide exactly with integer pixel coordinates. The values S(−N) . . . S(N) form the profile of the edge centered at point (0). The edge profile is normalized to produce $S_{norm}$ as follows:

$$S_{flat}(n)=S(-N)+(n+N)*(S(N)-S(-N))/(2N)$$

$$S_{norm}(n)=\max[0,S(n)-S_{flat}(n)-kS(0)]$$

where k is a constant set to remove very small edges, i.e., k=0.2, and n ranges from −N to N.

An objective way of determining the spread of $S_{norm}$ is required. An autocorrelation on $S_{norm}$ to give $R_{norm}$ works successfully. This autocorrelation $R_{norm}$ is scaled so that the sum of its coefficients is equal to one. The spread $S_p$ is then calculated by weighting the coefficients $R_{norm}$ proportional to the square of their distance from a weighted central location $P_{prod}$.

$$P_{prod}=\text{sum}[nR_{norm}(n)]$$

$$S_p=\text{sum}[(n-P_{prod})^2 R_{norm}(n)]$$

where n ranges from −N to N. In this way a measure of the spread is determined for each valid point in the image. High values of $S_p$ indicate a highly spread edge, and therefore strong blurring, while low values of spread indicate a very sharp edge. For a given value of N a theoretical maximum level of spread may be calculated. This enables the blurring to be represented in a unit based on the maximum possible blurring, which is useful since it allows meaningful comparison across different edges and different scenes.

To calculate the blurring value for an entire image or frame, a histogram of $S_p$ values is taken, and a $p^{th}$ highest percentile is used to indicate the average amount of blurring for the image or frame. Values of p=40–50% provide good results.

Blurring values for an entire video sequence or a specific section of the video sequence may also be calculated. The mean of the frame blurring values provides a good indication of sequence blurring. Other more complex methods, such as Minkowski summation or min-max calculation, may also be used.

Figure 5:
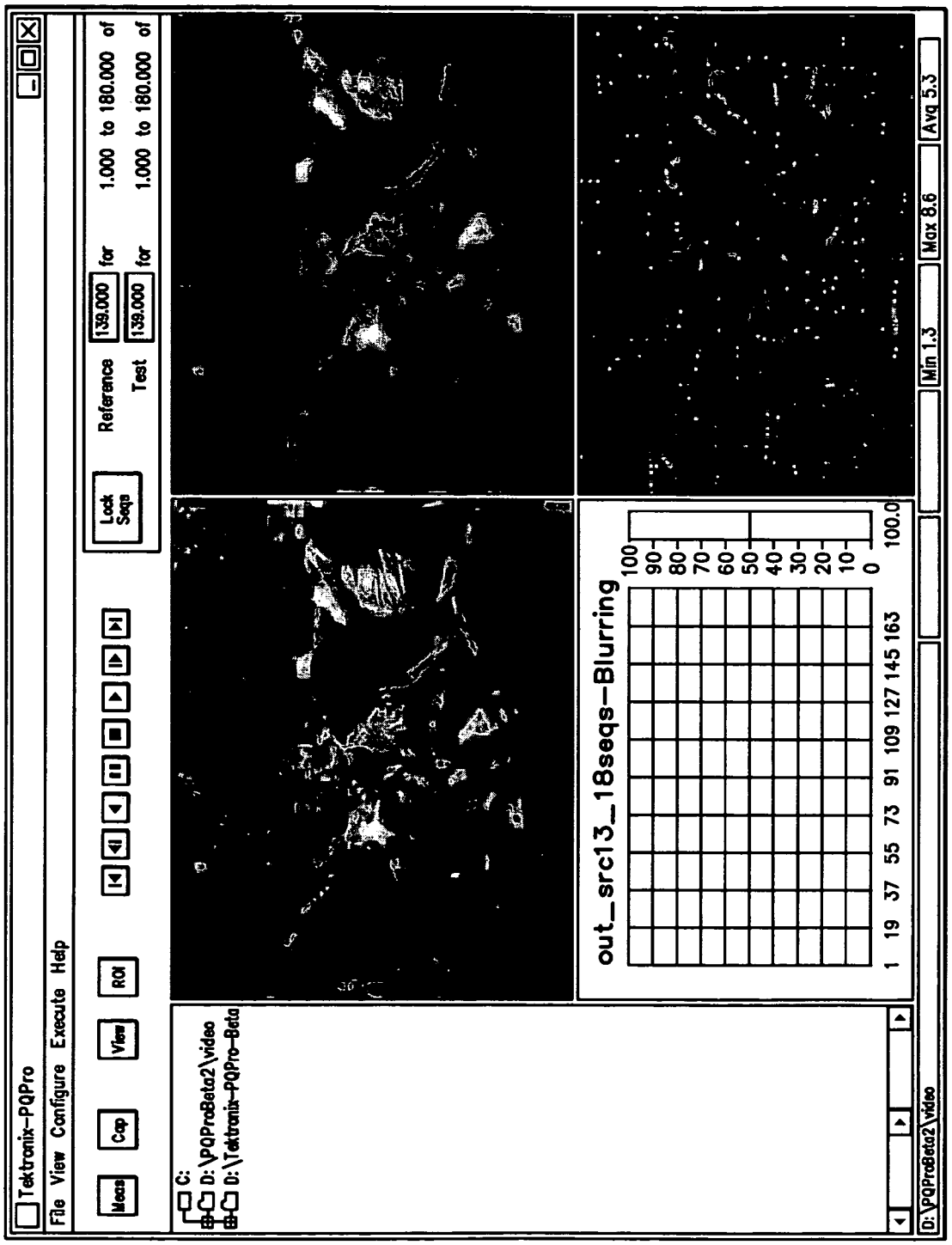
FIG. 5 is a plan view of a blurring map output showing blurring value over time/frame number for a blurred frame according to the present invention.
Figure 6:
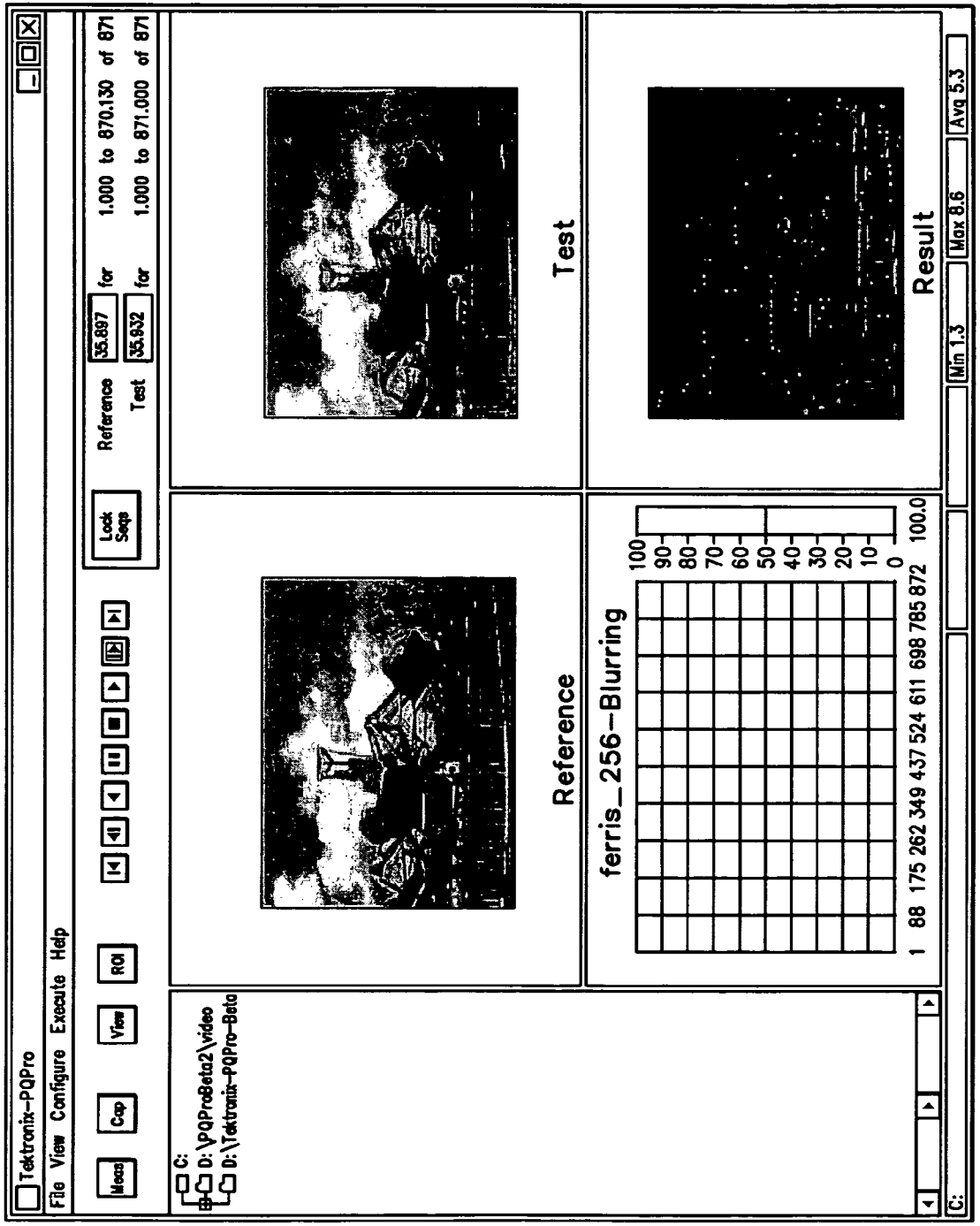
FIG. 6 is a plan view of a blurring map output showing blurring value over time/frame number for a compressed frame according to the present invention.

As well as outputting a blurring value for each frame, a blurring map is also provided. The blurring map indicates the areas in the image where the blurring is most visible. It is obtained by weighting the blockiness removed Sobel map with the frame blurring measure. Either a linear or a non-linear weighting may be used, depending upon the application for which the map is used. The linear weighting has been tested successfully, as shown in FIG. 5, for blurring in an uncompressed video image. FIG. 6 is a corresponding view of blurring in a compressed video image. FIGS. 5 and 6 in the upper quadrants show the reference and test video images, in the lower left quadrant show the blurring values over time/frame numbers, and in the lower right quadrant show the blurring map with the valid edge points. The non-linear weighting may be achieved in a number of ways, such as by using a non-linear "S" curve or by performing a local weighting near the valid points based on the estimated strength of the edge at each valid point.

A reduced-reference blurring measurement works in a very similar way to the single-ended blurring measurement described above. The single-ended blurring is calculated on a reference frame, with the resulting blurring value being passed along with a test frame, perhaps using a different channel or the video header. At a receiver the single-ended measurement is performed on the test frame to produce a test blurring value. The test blurring value is compared with the reference blurring value in order to determine the amount of blurring introduced into the test frame. Once again both linear and non-linear methods may be used to perform this comparison. A simple subtraction of the reference and test blurring values provides good results.

Figure 4:
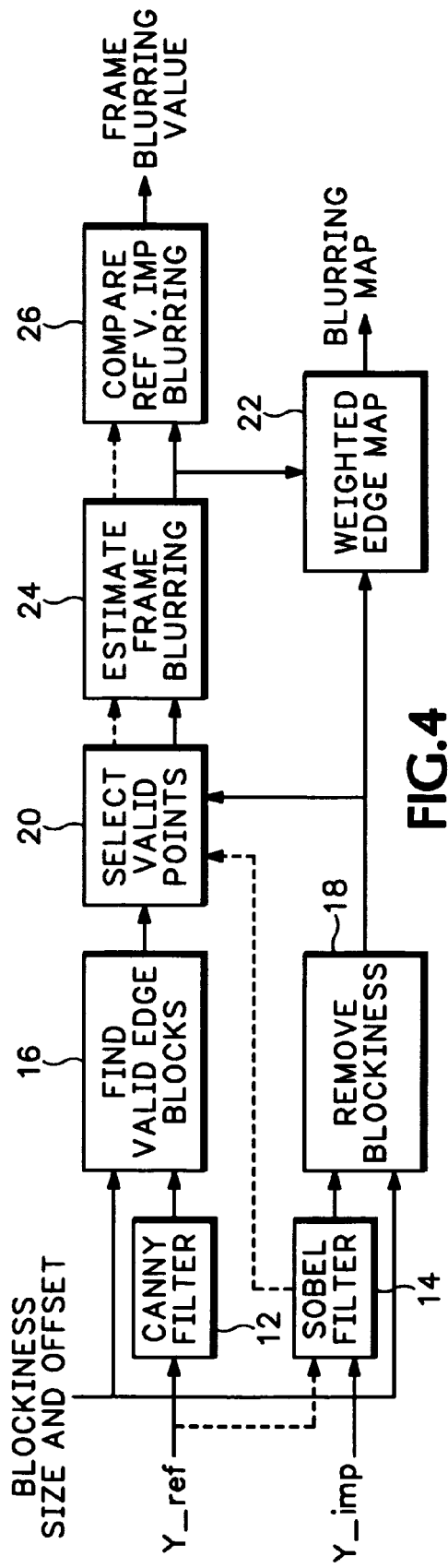
FIG. 4 is a block diagram view of a double-ended blurring estimation algorithm according to the present invention.

Some slight modifications may be performed when performing double-ended blurring measurement, as shown in FIG. 4. In its simplest form the double-ended measurement may be made by performing separate single-ended measurements on both the reference and test videos and then comparing the results. An alternative is to perform the Canny filtering and valid edge block selection using the reference video only. This approach offers computational as well as potential accuracy improvements. Further modifications may also be made, such as using the same valid edge points for both the reference and test frames prior to the blurring estimation. Since the double-ended measurement provides a relative estimate of the blurring between the reference and test videos, this approach is typically more consistent across different types of video since it is not as source dependent as the single-ended approach.

Therefore as shown in FIG. 4 the reference luminance frame (Y_ref) is input to the Canny filter 12 while the test or impaired luminance frame (Y_imp) is input to the Sobel filter 14. The selection of valid image edge blocks by the selection block 16 is determined by Y_ref and the blockiness size and offset information, while the impaired Sobel edge map from the blockiness removal block 18 is determined by Y_imp and the blockiness size and offset information. The determination of valid edge points, the frame blurring estimation and the weighted blurring map are computed as in the single-ended approach for both Y_ref and Y_imp, with the Y_ref output from the Sobel filter 14 bypassing the blockiness removal block 18, as indicated by the dotted lines. What is added is a comparison block 26 that compares the reference blurring value with the impaired blurring value to determine a relative blurring estimate. With the double-ended approach artistic blurring is accounted for so that only undesired blurring due to video processing of the reference video to produce the impaired video is measured.

Figure 7:
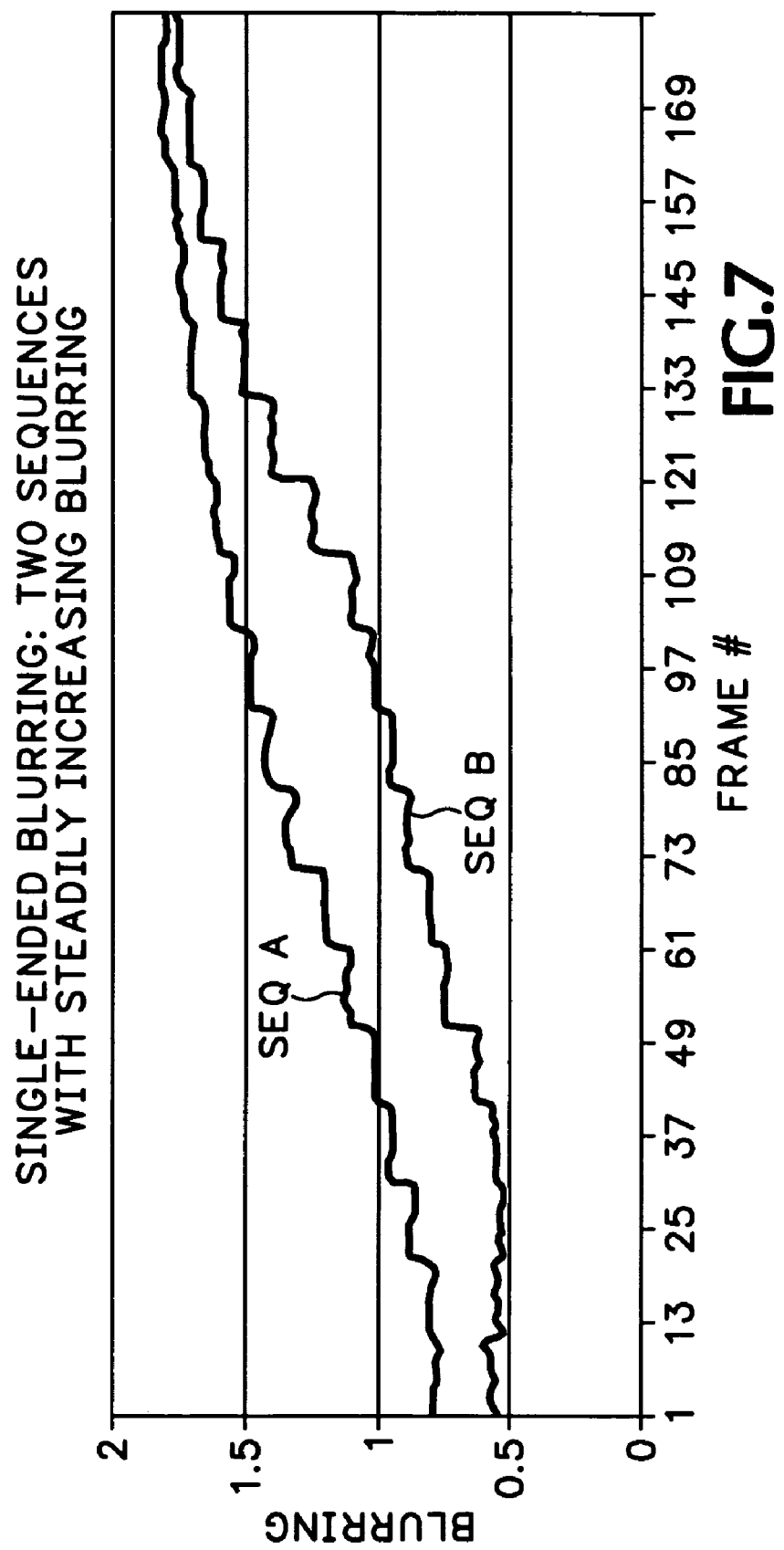
FIG. 7 is a graphic view of single-ended blur values for two different video sequences with increasing blurring artifacts introduced as achieved according to the present invention.

Finally FIG. 7 shows the results produced by the present invention when blurring is gradually introduced over a period of time/frames for two different video sequences.

Thus the present invention provides a blurring measurement for a video sequence by selecting blocks in the image that have valid edges based on a Canny filtered output for the video sequence and removing block boundaries from the video sequence using a Sobel filter, by selecting valid edge points centrally located within the selected valid edge blocks, by estimating spread normal to the edge, and by determining an average for the image or sequence or portion of sequence based on histograms of the estimated spread. Also a blurring map is generated from the block boundary corrected Sobel output weighted by the blurring estimate.

What is claimed is:

1. A method of estimating blurring due to video processing in a test video sequence comprising the steps of:
   detecting blocks within each frame of the test video sequence that have a valid image edge by filtering each frame of the test video sequence to produce a filtered output having either a zero or a one at each pixel location within each frame with the ones identifying an edge; and identifying the blocks within each frame that have the valid image edge as a function of the filtered output and a block size value by counting a number of transitions from zero to one around the perimeter of each block, and determining as a function of the number for each block whether the block has a valid edge;
   selecting an edge point centrally located within each detected block as a function of an edge enhanced version of the test video sequence without video processing induced block boundary edges; and
   estimating a blurring value for the test video sequence as a function of normals to the valid image edges at the edge points.

2. The method as recited in claim 1, further comprising the step of:
   generating a blurring map from the edge enhanced version of the test video sequence without video processing induced block boundary edges and the blurring value.

3. The method as recited in claim 1 further comprising the step of comparing the blurring value with a reference blurring value for a reference video sequence transmitted with the test video sequence to obtain a relative blurring value for the test video sequence.

4. The method as recited in claim 1 further comprising the steps of: repeating the detecting, selecting and estimating steps for a reference video sequence corresponding to the test video sequence to produce a reference blurring value; and
   comparing the blurring value with the reference blurring value to obtain a relative blurring value for the test video sequence.

5. A method of estimating blurring due to video processing in a test video sequence comprising the steps of:
   detecting blocks within each frame of the test video sequence that have a valid image edge by filtering each frame of a reference video sequence corresponding to the test video sequence to produce a filtered output having either a zero or a one at each pixel location within each frame with the ones identifying an edge; identifying the blocks within each frame that have the valid image edge as a function of the filtered output and a block size; and applying the detected blocks for the reference video sequence as the detected blocks for the test video sequence;
   selecting an edge point centrally located within each detected block as a function of an edge enhanced version of the test video sequence without video processing induced block boundary edges; and
   estimating a blurring value for the test video sequence as a function of normals to the valid image edges at the edge points.

6. The method as recited in claim 5 further comprising the step of comparing the blurring value with a reference blurring value for a reference video sequence transmitted with the test video sequence to obtain a relative blurring value for the test video sequence.

* * * * *